US012565203B2

(12) United States Patent
Suzuki

(10) Patent No.: US 12,565,203 B2
(45) Date of Patent: Mar. 3, 2026

(54) DRIVING CONTROL DEVICE

(71) Applicant: ISUZU MOTORS LIMITED, Tokyo (JP)

(72) Inventor: Motoya Suzuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 276 days.

(21) Appl. No.: 18/551,103

(22) PCT Filed: Mar. 23, 2022

(86) PCT No.: PCT/JP2022/013391
§ 371 (c)(1),
(2) Date: Sep. 18, 2023

(87) PCT Pub. No.: WO2022/202877
PCT Pub. Date: Sep. 29, 2022

(65) Prior Publication Data
US 2024/0190426 A1 Jun. 13, 2024

(30) Foreign Application Priority Data

Mar. 26, 2021 (JP) ................................. 2021-053284

(51) Int. Cl.
*B60W 30/10* (2006.01)
*B60W 30/16* (2020.01)
*B62D 6/00* (2006.01)

(52) U.S. Cl.
CPC ............ *B60W 30/10* (2013.01); *B60W 30/16* (2013.01); *B62D 6/002* (2013.01)

(58) Field of Classification Search
CPC ........ B62D 6/002; B60W 30/10; B60W 30/16
(Continued)

(56) References Cited

U.S. PATENT DOCUMENTS 8,340,883 B2 * 12/2012 Arbitmann ............ B60W 10/06
701/30.9
8,718,919 B2 * 5/2014 Leineweber ........... G08G 1/163
340/913
(Continued)

FOREIGN PATENT DOCUMENTS

JP 2001-034341 A 2/2001
JP 2004-042884 A 2/2004
(Continued)

OTHER PUBLICATIONS

International Search Report from International Application No. PCT/JP2022/013391 mailed Jun. 7, 2022.

*Primary Examiner* — Andrew Joseph Rudy
(74) *Attorney, Agent, or Firm* — Shih IP Law Group, PLLC

(57) ABSTRACT

A driving control device has: a deciding section that decides a first weighting coefficient and a second weighting coefficient in an evaluation function including, as variables, a lateral deviation of a vehicle, a speed deviation of the vehicle, an azimuth deviation of the vehicle, an acceleration/deceleration instruction value and a steering angle instruction value; a calculating section that calculates the acceleration/deceleration instruction value and the steering angle instruction value for a time of a next period for minimizing or maximizing an output value of the evaluation function, by periodically inputting the lateral deviation, the speed deviation and the azimuth deviation to the evaluation function; and a travel control section that causes the vehicle to travel on a basis of the acceleration/deceleration instruction value and the steering angle instruction value.

10 Claims, 4 Drawing Sheets

(58) Field of Classification Search
USPC ........................................................ 701/1, 41
See application file for complete search history.

(56) References Cited

U.S. PATENT DOCUMENTS

| | | | |
|---|---|---|---|
| 9,058,246 B2 * | 6/2015 | Shida | G08G 1/163 |
| 11,608,108 B2 * | 3/2023 | Maruyama | B62D 5/0484 |
| 11,745,706 B2 | 9/2023 | Nakagawa | |
| 11,872,983 B2 * | 1/2024 | Matsunaga | B60W 30/095 |
| 11,884,273 B2 * | 1/2024 | Uemura | B62D 15/025 |
| 2004/0006423 A1 | 1/2004 | Fujimoto et al. | |
| 2004/0024565 A1 | 2/2004 | Yu | |
| 2006/0033308 A1 * | 2/2006 | Waldbauer | B60T 8/241 |
| | | | 280/455.1 |
| 2009/0099717 A1 | 4/2009 | Yabushita | |
| 2009/0287376 A1 | 11/2009 | Aso | |
| 2011/0106391 A1 | 5/2011 | Shida | |
| 2020/0149906 A1 | 5/2020 | Tu | |
| 2020/0238980 A1 * | 7/2020 | Goto | B60W 30/09 |
| 2020/0249038 A1 | 8/2020 | Nashed | |
| 2020/0307612 A1 | 10/2020 | Nakamura | |
| 2021/0009115 A1 | 1/2021 | Ohmur | |

FOREIGN PATENT DOCUMENTS

| | | | |
|---|---|---|---|
| JP | 37071992 | B2 | 10/2005 |
| JP | 2008-143269 | A | 6/2008 |
| JP | 4297123 | B2 | 7/2009 |
| JP | 2012-002678 | A | 1/2012 |
| JP | 2012-126293 | A | 7/2012 |
| JP | 2014-142303 | A | 8/2014 |
| JP | 6477253 | B2 | 12/2016 |
| JP | 2019-142303 | A | 8/2019 |
| JP | 2019-156059 | A | 9/2019 |
| JP | 2019-189121 | A | 10/2019 |
| JP | 2020-026189 | A | 2/2020 |
| JP | 2020-164061 | A | 10/2020 |
| JP | 2021-503404 | A | 2/2021 |
| WO | 2010100725 | A1 | 9/2010 |

* cited by examiner

DRIVING CONTROL DEVICE

The present application is a U.S. National Stage entry of PCT Application number PCT/JP2022/013391, filed on Mar. 23, 2022, which claims priority under 35 U.S.C § 119(a) to Japanese Patent Application No. 2021-053284, filed on Mar. 26, 2021, contents of which are incorporated herein by reference in their entirety.

TECHNICAL FIELD

The present invention relates to a driving control device.

BACKGROUND OF THE INVENTION

There are conventionally known travel control devices for causing a vehicle to travel along a target route. Patent Document 1 discloses a travel control device that calculates a target speed of a vehicle on the basis of the lateral deviation between the position of the vehicle and a target route.

PRIOR ART

Patent Document

Patent Document 1: Japanese Patent No. 6477253

SUMMARY OF INVENTION

Problems to be Solved by the Invention

Conventional travel control devices calculate a target speed of a vehicle on the basis of the curvature of a road surface where the vehicle is travelling and a lateral deviation, and accordingly the vehicle can travel at a speed suited for the road surface. However, there has been a problem that the vehicle cannot travel safely in some cases since the same target speed is calculated even in a case where the difference between the advancing direction of the vehicle and a direction represented by a target route is large or even in a case where the distance to a preceding vehicle travelling in front of the vehicle changed significantly.

In view of this, the present invention has been made taking these matters into consideration, and an object thereof is to improve the safety of a vehicle.

Means for Solving the Problems

A driving control device according to a mode of the present invention has: an acquiring section that acquires: a lateral deviation which is a difference between a position where a vehicle is travelling and a target travelling position of the vehicle in a direction orthogonal to an advancing direction of the vehicle; a speed deviation which is a difference between a speed of the vehicle and a target speed of the vehicle at the position where the vehicle is travelling; and an azimuth deviation which is a difference between an azimuth of the vehicle and a target azimuth of the vehicle at the position where the vehicle is travelling; a deciding section that decides a first weighting coefficient of the speed deviation and a second weighting coefficient of the lateral deviation in an evaluation function including, as variables, the lateral deviation, the speed deviation, the azimuth deviation, an acceleration/deceleration instruction value and a steering angle instruction value, on a basis of a situation around the position where the vehicle is travelling, the situation influencing at least any one of a travelling speed and a travelling position of the vehicle; a calculating section that calculates the acceleration/deceleration instruction value and the steering angle instruction value for a time of a next period for minimizing or maximizing an output value of the evaluation function, by periodically inputting the lateral deviation, the speed deviation and the azimuth deviation to the evaluation function; and a travel control section that causes the vehicle to travel on a basis of the acceleration/deceleration instruction value and the steering angle instruction value calculated by the calculating section.

The deciding section may increase the first weighting coefficient of the speed deviation in a case where a distance between the vehicle and a preceding vehicle travelling in front of the vehicle is shorter than a threshold.

The acquiring section may acquire an upper limit value of an absolute value of acceleration/deceleration of the vehicle, and the deciding section may reduce the first weighting coefficient of the speed deviation in a case where an absolute value of the acceleration/deceleration instruction value calculated by the calculating section is greater than the upper limit value.

The deciding section may decide a third weighting coefficient of the azimuth deviation in the evaluation function on a basis of a situation around the position where the vehicle is travelling, the situation influencing an orientation of the vehicle.

The deciding section may increase at least any one of the second weighting coefficient of the lateral deviation and the third weighting coefficient of the azimuth deviation in a case where the azimuth deviation is equal to or greater than a threshold.

The deciding section may increase the second weighting coefficient in a case where the azimuth deviation is equal to or greater than a threshold and the lateral deviation is large, and increase the third weighting coefficient in a case where the azimuth deviation is equal to or greater than the threshold and the lateral deviation is small.

The acquiring section may acquire a curvature of a road surface where the vehicle is travelling, and the deciding section may decide the third weighting coefficient of the azimuth deviation on a basis of a magnitude of the curvature acquired by the acquiring section.

The deciding section may increase the third weighting coefficient as the curvature acquired by the acquiring section increases.

The deciding section may increase at least any one of the second weighting coefficient of the lateral deviation and the third weighting coefficient of the azimuth deviation in a case where a distance between the vehicle and a lane boundary closest to the vehicle is shorter than a threshold.

The acquiring section may acquire an upper limit value of an absolute value of a steering angle of the vehicle, and the deciding section may reduce at least any one of the second weighting coefficient of the lateral deviation and the third weighting coefficient of the azimuth deviation in a case where the steering angle instruction value calculated by the calculating section is greater than the upper limit value.

Effect of the Invention

The present invention attains the effect of improving the safety of a vehicle.

DETAILED DESCRIPTION OF THE INVENTION

[Overview of Driving Control System S]

Figure 1:
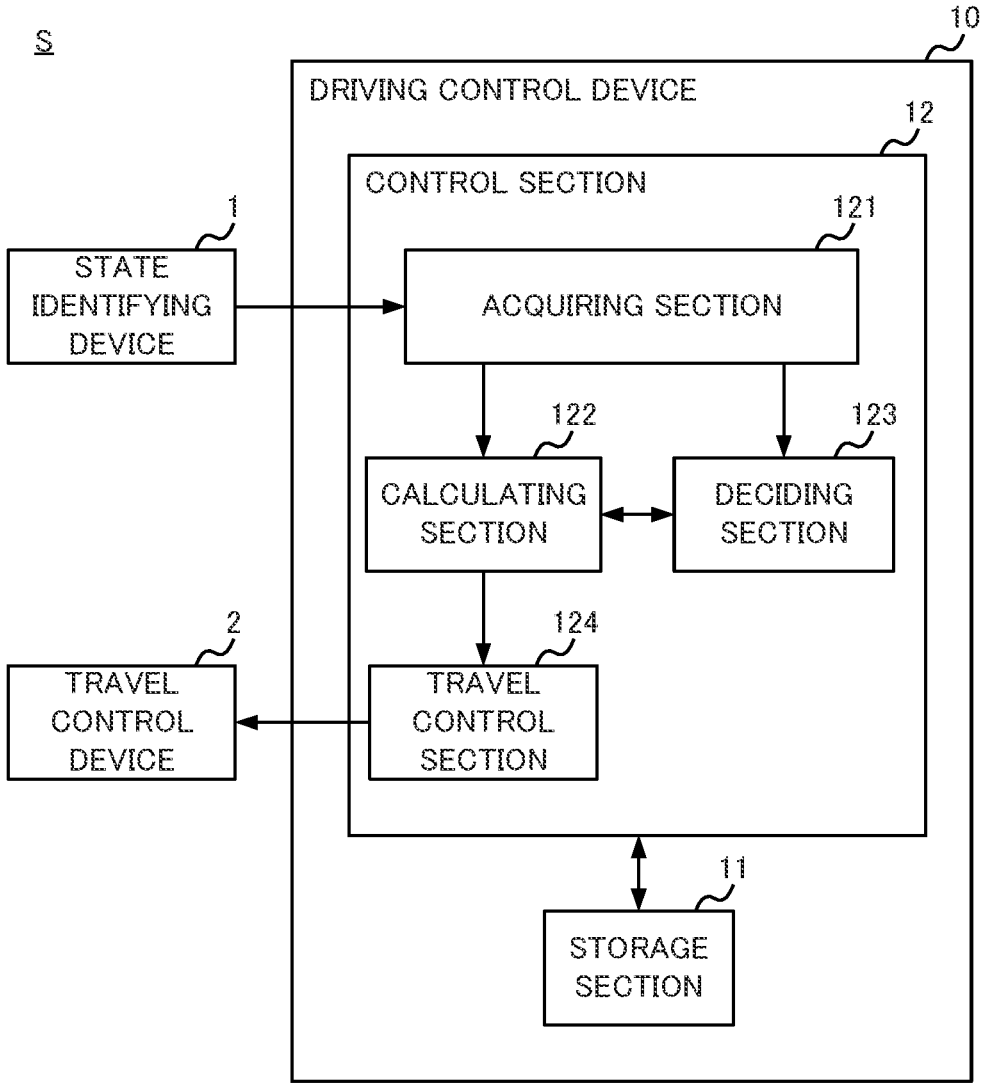
FIG. 1 is a figure depicting the configuration of a driving control system S.

FIG. 1 is a figure depicting the configuration of a driving control system S. The driving control system S includes a state identifying device 1, a travel control device 2 and a driving control device 10. The driving control system S is a system for causing a vehicle to travel along a target track by controlling the acceleration/deceleration and the steering angle of the vehicle, and is a system included in the vehicle. The target track is a predetermined track, and includes a plurality of target travelling positions of the vehicle, and target orientations of the vehicle each of which corresponds to one of the plurality of travelling positions. For example, the target track is stored on a storage section (not depicted) of the state identifying device 1.

The state identifying device 1 periodically identifies parameters representing the vehicle state. For example, the parameters representing the vehicle state are the lateral deviation of the vehicle, the speed deviation of the vehicle, the azimuth deviation of the vehicle, the upper limit value of the absolute value of the acceleration/deceleration of the vehicle and the upper limit value of the absolute value of the steering angle of the vehicle. The lateral deviation is the difference between a position where the vehicle is travelling and a target travelling position of the vehicle in a direction orthogonal to the advancing direction of the vehicle. The speed deviation is the difference between the vehicle speed and a target speed of the vehicle corresponding to a position where the vehicle is travelling. The azimuth deviation is the difference between the orientation of the vehicle at a position where the vehicle is travelling and a target orientation of the vehicle corresponding to the position.

For example, the state identifying device 1 acquires the position and the orientation of the vehicle by acquiring GPS (Global Positioning System) signals. The state identifying device 1 identifies the lateral deviation of the vehicle on the basis of the acquired position of the vehicle and a target travelling position of the vehicle corresponding to the position of the vehicle. The state identifying device 1 identifies the azimuth deviation of the vehicle on the basis of the acquired orientation of the vehicle and a target orientation of the vehicle corresponding to the position of the vehicle. For example, the state identifying device 1 identifies the speed deviation which is the difference between the speed of the vehicle measured by a speed sensor (not depicted) included in the vehicle and a target speed of the vehicle corresponding to a position where the vehicle is travelling.

For example, the state identifying device 1 acquires the upper limit value of the absolute value of the acceleration/deceleration of the vehicle or the upper limit value of the absolute value of the steering angle of the vehicle output by an ECU (Electronic Control Unit). The state identifying device 1 outputs the identified parameters representing the vehicle state to the driving control device 10.

As parameters representing the situation around the vehicle, the state identifying device 1 identifies the curvature of a road surface where the vehicle is travelling, the distance between the vehicle and a preceding vehicle travelling in front of the vehicle, and the distances between the vehicle and lane boundaries. For example, the state identifying device 1 identifies the curvature of the road surface corresponding to the acquired position of the vehicle on the basis of map information stored on the storage section of the state identifying device 1. For example, the state identifying device 1 identifies the distance between the vehicle and the preceding vehicle, and the distances between the vehicle and the lane boundaries on the basis of data of captured images captured by an image-capturing device (not depicted) included in the vehicle. The state identifying device 1 outputs the identified parameters representing the situation around the vehicle to the driving control device 10.

The travel control device 2 controls the speed and the orientation of the vehicle. The travel control device 2 controls the acceleration/deceleration and the steering angle of the vehicle in accordance with an acceleration/deceleration instruction value for giving an instruction about the acceleration/deceleration of the vehicle and a steering angle instruction value for giving an instruction about the steering angle of the vehicle for the time of the next period that are periodically output by the driving control device 10.

The driving control device 10 periodically inputs, to an evaluation function, the parameters representing the vehicle state output by the state identifying device 1. In order to improve the safety of the vehicle, the driving control device 10 periodically decides the values of weighting coefficients included in the evaluation function on the basis of the parameters representing the situation around the vehicle that are output by the state identifying device 1. The driving control device 10 identifies the acceleration/deceleration instruction value and the steering angle instruction value for minimizing an output value of the evaluation function, and inputs the identified acceleration/deceleration instruction value and steering angle instruction value to the travel control device 2. As a result, the travel control device 2 can execute travel control suited for the situation around the vehicle, and accordingly the safety of travelling of the vehicle is improved. Hereinbelow, the configuration of and an operation performed by the driving control device 10 are explained in detail.

[Configuration of Driving Control Device 10]

The driving control device 10 has a storage section 11 and a control section 12. The control section 12 has an acquiring section 121, a calculating section 122, a deciding section 123 and a travel control section 124. The driving control device 10 periodically calculates the acceleration/deceleration instruction value of the vehicle and the steering angle instruction value of the vehicle by using the evaluation function to which the lateral deviation, the speed deviation and the azimuth deviation that are output by the state identifying device 1 are input, and outputs the acceleration/deceleration instruction value of the vehicle and the steering angle instruction value of the vehicle to the travel control device 2.

The storage section 11 has a storage medium such as a ROM (Read Only Memory), a RAM (Random Access Memory) or an SSD (Solid State Drive). The storage section 11 has stored thereon programs to be executed by the control section 12. For example, the control section 12 is a CPU (Central Processing Unit). The control section 12 operates as the acquiring section 121, the calculating section 122, the deciding section 123 and the travel control section 124 by executing the programs stored on the storage section 11.

The acquiring section 121 periodically acquires the parameters representing the vehicle state output by the state identifying device 1. The acquiring section 121 acquires the lateral deviation, the speed deviation and the azimuth deviation. The lateral deviation is the difference between a position where the vehicle is travelling and a target travelling position of the vehicle in a direction orthogonal to the advancing direction of the vehicle. The speed deviation is the difference between the vehicle speed and a target speed of the vehicle at a position where the vehicle is travelling. The azimuth deviation is the difference between the azimuth of the vehicle and a target azimuth of the vehicle at a position where the vehicle is travelling. The acquiring section 121 may acquire: the curvature of a road surface where the vehicle is travelling; the upper limit value of the absolute value of the acceleration/deceleration of the vehicle; the upper limit value of the absolute value of the steering angle of the vehicle; the distance to a preceding vehicle travelling in front of the vehicle; and the distance between the vehicle and a lane.

The calculating section 122 calculates the acceleration/deceleration instruction value and the steering angle instruction value for the time of the next period for minimizing or maximizing the output value of the evaluation function by periodically inputting the lateral deviation, the speed deviation and the azimuth deviation that are acquired by the acquiring section 121 to the evaluation function. The evaluation function is represented by the following Formula (1), Formula (2) and Formula (3) by using the lateral deviation ex, the azimuth deviation eθ, the speed deviation evx, the acceleration/deceleration instruction value ar and the steering angle instruction value δ.

[Equation 1]

$$x = \begin{bmatrix} e_x \\ e_\theta \\ e_{vx} \end{bmatrix} \quad (1)$$

$$u = \begin{bmatrix} a_r \\ \delta \end{bmatrix} \quad (2)$$

$$J = \sum_{k_t=1}^{p} \left( x^T[k + k_t]Qx[k + k_t] + u^T[k + k_t]Ru[k + k_t] \right) + \rho_s \epsilon \quad (3)$$

In Formula (3), p is a period for which the output value J of the evaluation function is calculated, ρs is a barrier function or a penalty function for avoiding violation of the upper limit value of the absolute value of the acceleration/deceleration and the upper limit value of the absolute value of the steering angle which are constraints, ε is a slack variable, and Q and R are weighting coefficients. The weighting coefficient Q and the weighting coefficient R are decided by the deciding section 123 on the basis of the situation around a position where the vehicle is travelling. Details of the weighting coefficient Q and the weighting coefficient R are mentioned later. In the present embodiment, the calculating section 122 calculates the acceleration/ deceleration instruction value ar and the steering angle instruction value δ such that the output value J is minimized.

The deciding section 123 decides the first weighting coefficient of the speed deviation and the second weighting coefficient of the lateral deviation in the evaluation function including, as variables, the lateral deviation ex, the speed deviation evx, the azimuth deviation eθ, the acceleration/deceleration instruction value ar and the steering angle instruction value δ. The deciding section 123 decides the first weighting coefficient and the second weighting coefficient on the basis of the situation around a position where the vehicle is travelling, the situation influencing at least any one of the travelling speed and the travelling position of the vehicle.

For example, the first weighting coefficient and the second weighting coefficient are coefficients included in at least any one of the weighting coefficient Q and the weighting coefficient R represented by Formula (3). The first weighting coefficient is associated with at least any one of the speed deviation evx and the acceleration/deceleration instruction value ar. The second weighting coefficient is associated with at least any one of the lateral deviation ex and the steering angle instruction value δ.

For example, the deciding section 123 increases the first weighting coefficient of the speed deviation in a case where the distance between the vehicle and a preceding vehicle travelling in front of the vehicle is shorter than a threshold. For example, the threshold is a distance that is likely to lead to contact with the preceding vehicle in a case where the vehicle does not decelerate.

Figure 2A:
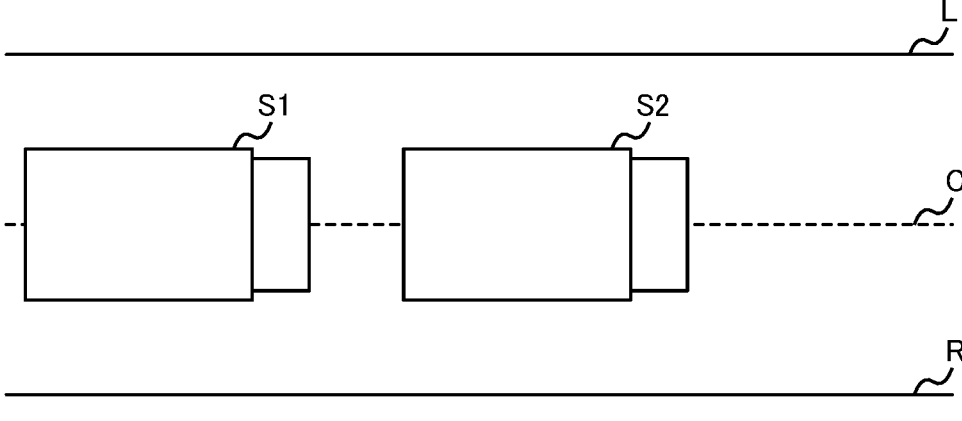
FIG. 2A is a figure depicting a state before a deciding section 123 increases a first weighting coefficient in a driving control device 10 included in a vehicle S1.
Figure 2B:
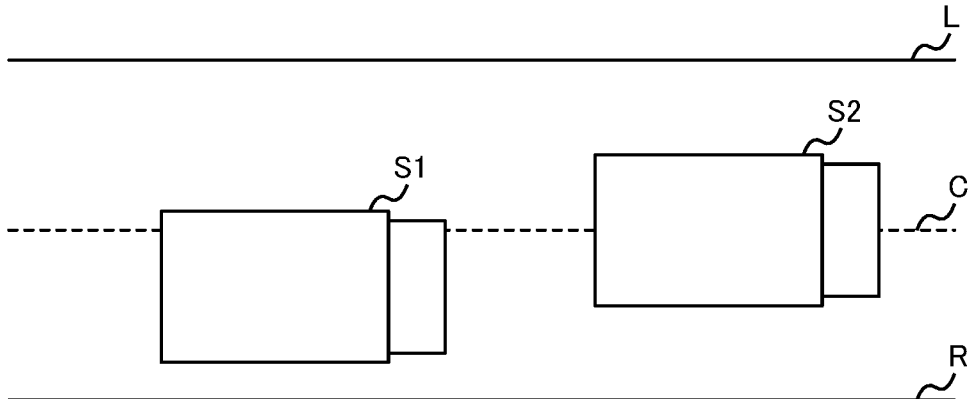
FIG. 2B is a figure depicting a state after the deciding section 123 increased the first weighting coefficient in the driving control device 10 included in the vehicle S1.

FIGS. 2A and 2B are figures for explaining an operation performed by the deciding section 123 to increase the first weighting coefficient. FIG. 2A is a figure depicting a state before the deciding section 123 increases the first weighting coefficient in the driving control device 10 included in a vehicle S1. FIG. 2B is a figure depicting a state after the deciding section 123 increased the first weighting coefficient in the driving control device 10 included in the vehicle S1. A lane boundary L is a left white line in the advancing direction of the vehicle, a lane boundary R is a right white line in the advancing direction of the vehicle, and a target track C is a target track of the vehicle S1.

In FIG. 2A, for example, the deciding section 123 identifies that the distance between the vehicle S1 and a preceding vehicle S2 is shorter than the threshold on the basis of the distance between the vehicle S1 and the preceding vehicle S2 that is acquired by the acquiring section 121 from the state identifying device 1. Since it is necessary to decelerate the speed of the vehicle S1 in this case, the deciding section 123 increases the first weighting coefficient.

By increasing the first weighting coefficient, the influence of changes of the speed deviation evx and the acceleration/deceleration instruction value ar on the output value J of the evaluation function represented by Formula (3) becomes greater than the influence of changes of the lateral deviation ex, the azimuth deviation eθ and the steering angle instruction value δ on the output value J. Because of this, the calculating section 122 minimizes the output value J by calculating such an acceleration/deceleration instruction value ar and a steering angle instruction value δ that the rate of change of the speed deviation evx or the acceleration/deceleration instruction value ar becomes greater than the rates of change of the lateral deviation ex, the azimuth deviation eθ and the steering angle instruction value δ.

Since the calculating section 122 calculates the acceleration/deceleration instruction value ar and the steering angle instruction value δ prioritizing deceleration of the speed of the vehicle S1 over reduction of the lateral deviation ex of the vehicle S1, the vehicle S1 can increase the distance to the preceding vehicle S2 as depicted in FIG. 2B. On the other hand, the lateral deviation ex between the vehicle S1 and the target track C increases. Since the calculating section 122 operates in this manner, the vehicle S1 can suppress contact with the preceding vehicle S2.

The deciding section 123 prevents the acceleration/deceleration instruction value ar calculated by the calculating section 122 from becoming greater than the absolute value of the upper limit value of the acceleration/deceleration by reducing the first weighting coefficient of the speed deviation in a case where the absolute value of the acceleration/deceleration instruction value ar is greater than the upper limit value. Since the deciding section 123 operates in this manner, the vehicle S1 can suppress destabilization of operation of the vehicle S1 due to significant acceleration, significant deceleration, and so on.

The deciding section 123 may decide the third weighting coefficient of the azimuth deviation eθ in the evaluation function on the basis of the situation around a position where the vehicle is travelling, the situation influencing the orientation of the vehicle. For example, the third weighting coefficient is a coefficient included in the weighting coefficient Q or the weighting coefficient R represented by Formula (3), and is associated with at least any one of the azimuth deviation eθ and the steering angle instruction value δ.

For example, the deciding section 123 decides the third weighting coefficient of the azimuth deviation eθ on the basis of the magnitude of a curvature acquired by the acquiring section 121. For example, the deciding section 123 increases the third weighting coefficient as the curvature of a road surface where the vehicle S1 is travelling increases. Since the deciding section 123 operates in this manner, the calculating section 122 minimizes the output value J by calculating such a steering angle instruction value δ and an acceleration/deceleration instruction value ar that the rate of change of the lateral deviation ex, the azimuth deviation eθ or the steering angle instruction value δ becomes greater than the rates of change of the speed deviation evx and the acceleration/deceleration instruction value ar in a case where it is necessary to significantly change the orientation of the vehicle S1. As a result, the vehicle S1 can travel in accordance with the orientation of the target track C, and accordingly it is possible to suppress travelling beyond the left and right white lines of the lane, contact with a guardrail, and so on, for example.

The deciding section 123 may increase at least any one of the second weighting coefficient of the lateral deviation and the third weighting coefficient of the azimuth deviation in a case where the azimuth deviation eθ is equal to or greater than a threshold. For example, the threshold is an azimuth deviation that is likely to lead to travelling of the vehicle S1 beyond a lane. For example, the deciding section 123 increases the second weighting coefficient associated with the lateral deviation ex in order to make a position where the vehicle is travelling close to the target track C in a case where the azimuth deviation eθ is equal to or greater than the threshold and the lateral deviation ex is large.

On the other hand, for example, the deciding section 123 increases the third weighting coefficient associated with the azimuth deviation eθ in order to change the orientation of travelling of the vehicle S1 in a case where the azimuth deviation eθ is equal to or greater than the threshold and the lateral deviation ex is small. Since the deciding section 123 increases at least any one of the second weighting coefficient and the third weighting coefficient on the basis of the azimuth deviation eθ and the lateral deviation ex in this manner, the calculating section 122 can calculate an appropriate steering angle instruction value δ according to the state of the vehicle S1.

The deciding section 123 may increase at least any one of the second weighting coefficient of the lateral deviation and the third weighting coefficient of the azimuth deviation in a case where the distance between the vehicle and a lane boundary closest to the vehicle is shorter than a threshold. For example, the threshold is a distance that is likely to lead to contact of the vehicle with at least any one of the left and right lane boundaries of a lane where the vehicle is travelling.

Figure 3A:
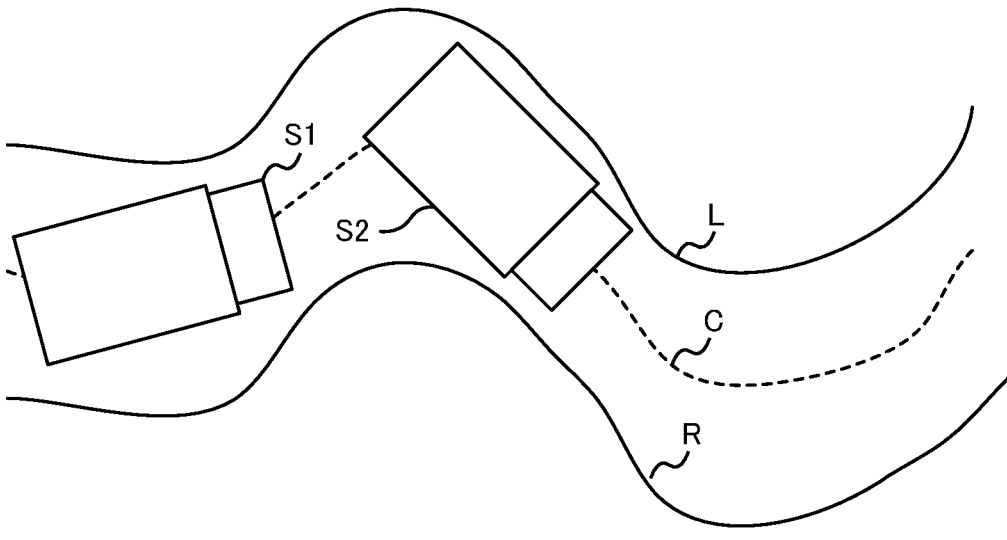
FIG. 3A is a figure depicting a state before the deciding section 123 increases a second weighting coefficient and a third weighting coefficient in the driving control device 10 included in the vehicle S1.
Figure 3B:
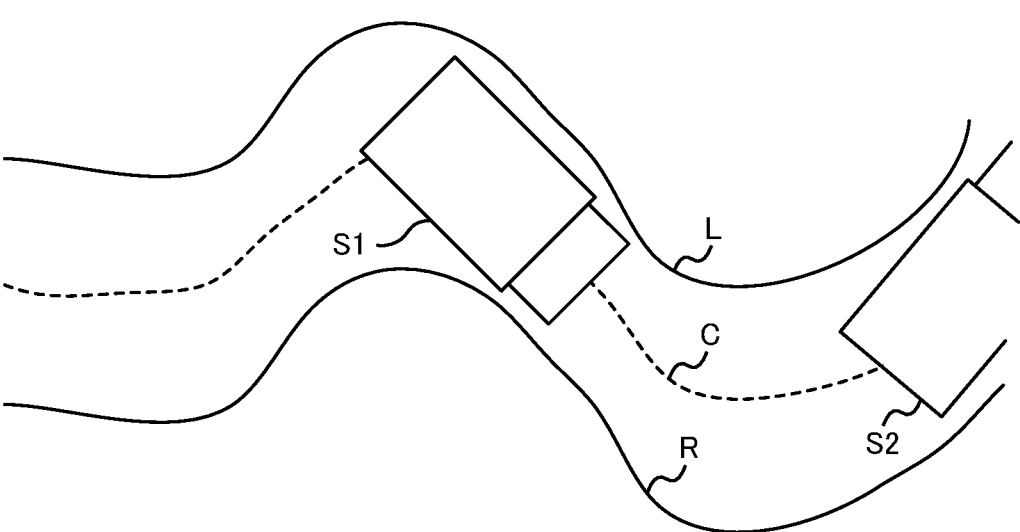
FIG. 3B is a figure depicting a state after the deciding section 123 increased the second weighting coefficient and the third weighting coefficient in the driving control device 10 included in a vehicle S1.

FIGS. 3A and 3B are figures for explaining an operation performed by the deciding section 123 to increase the second weighting coefficient and the third weighting coefficient. FIG. 3A is a figure depicting a state before the deciding section 123 increases the second weighting coefficient and the third weighting coefficient in the driving control device 10 included in the vehicle S1. FIG. 3B is a figure depicting a state after the deciding section 123 increased the second weighting coefficient and the third weighting coefficient in the driving control device 10 included in a vehicle S1.

In FIG. 3A, for example, the deciding section 123 identifies that the distance between the vehicle S1 and at least any one of the lane boundary L and the lane boundary R is shorter than the threshold on the basis of the distance between the vehicle S1 and the lane boundary that is acquired by the acquiring section 121 from the state identifying device 1. Since it is necessary to control the vehicle S1 such that it moves away from the lane boundary in this case, the deciding section 123 increases the second weighting coefficient and the third weighting coefficient.

Regarding the output value J of the evaluation function represented by Formula (3), the influence of changes of the lateral deviation ex, the azimuth deviation eθ and the steering angle instruction value δ on the output value J becomes greater than the influence of the speed deviation evx and the acceleration/deceleration instruction value ar on the output value by increasing the second weighting coefficient and the third weighting coefficient. Because of this, the calculating section 122 minimizes the output value J by calculating such a steering angle instruction value δ and an acceleration/deceleration instruction value ar that the rate of change of the lateral deviation ex, the azimuth deviation eθ or the steering angle instruction value δ of the vehicle S1 becomes greater than the rate of change of the speed deviation evx or the acceleration/deceleration instruction value ar.

Since the calculating section 122 calculates the acceleration/deceleration instruction value ar and the steering angle instruction value δ prioritizing reduction of the lateral deviation ex and the azimuth deviation eθ of the vehicle S1 over reduction of the speed deviation evx of the vehicle S1, the vehicle S1 can travel such that it does not travel beyond the lane boundaries as depicted in FIG. 3B. On the other hand, the calculating section 122 does not output an instruction value for accelerating the vehicle S1 even if the distance between the vehicle S1 and the preceding vehicle S2 increases. Since the calculating section 122 operates in this manner, the calculating section 122 can improve the safety of the vehicle even if the vehicle is travelling on a road surface with a narrow width and a large curvature as depicted in FIGS. 3A and 3B.

The deciding section 123 may reduce at least any one of the second weighting coefficient of the lateral deviation or the third weighting coefficient of the azimuth deviation in a case where the steering angle instruction value δ calculated by the calculating section 122 is greater than an upper limit value. For example, the deciding section 123 prevents the steering angle instruction value δ calculated by the calculating section 122 from becoming greater than the upper limit value of the absolute value of the steering angle by reducing the second weighting coefficient or the third weighting coefficient in a case where the steering angle instruction value δ is greater than the upper limit value of the absolute value of the steering angle acquired by the acquiring section 121.

Since the deciding section 123 operates in this manner, the vehicle S1 can suppress destabilization of operation of the vehicle S1 due to a significant change of its orientation, a significant advancement in a direction orthogonal to the advancing direction, and so on.

The travel control section 124 causes the vehicle S1 to travel on the basis of the acceleration/deceleration instruction value ar and the steering angle instruction value δ that are calculated by the calculating section 122. The travel control section 124 causes the vehicle S1 to travel at a speed and in an orientation according to the acceleration/deceleration instruction value ar and the steering angle instruction value δ that are calculated by the calculating section 122 by periodically outputting, to the travel control device 2, the acceleration/deceleration instruction value ar and the steering angle instruction value δ.

[Flowchart of Driving Control Device 10]

Figure 4:
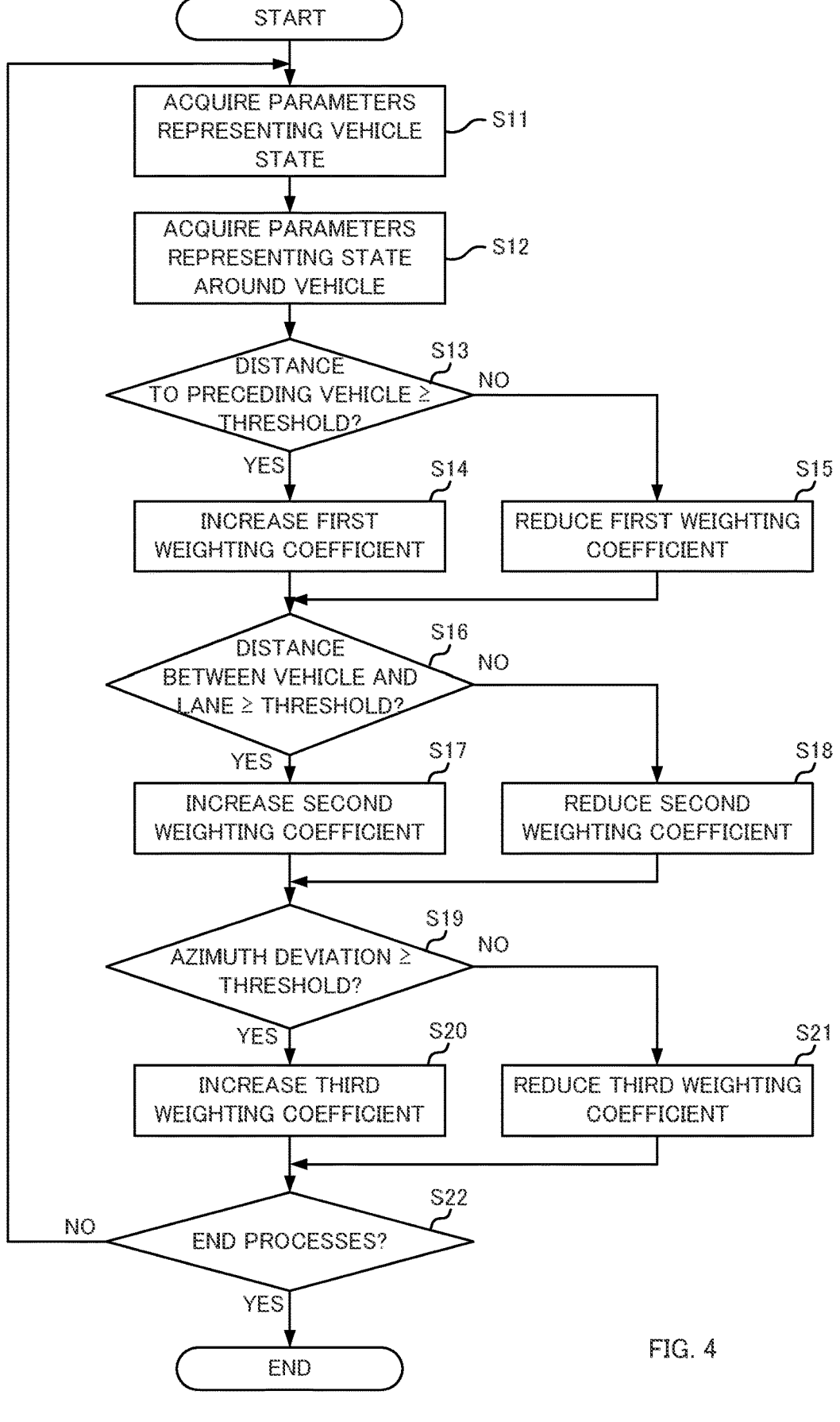
FIG. 4 is a flowchart depicting an example of an operation performed by a driving control device 10.

FIG. 4 is a flowchart depicting an example of an operation performed by the driving control device 10. The flowchart depicted in FIG. 4 depicts an operation performed by the deciding section 123 to decide the first weighting coefficient, the second weighting coefficient and the third weighting coefficient on the basis of parameters representing the vehicle state acquired by the acquiring section 121 from the state identifying device 1.

The acquiring section 121 acquires the lateral deviation of the vehicle, the speed deviation of the vehicle and the azimuth deviation of the vehicle which are parameters representing the vehicle state (S11). The acquiring section 121 acquires the distance between the vehicle and a preceding vehicle, and the distance between the vehicle and a lane boundary which are parameters representing the situation around a position where the vehicle is travelling (S12).

In a case where the distance between the vehicle and the preceding vehicle that is acquired by the acquiring section 121 is equal to or longer than the threshold (YES at S13), the deciding section 123 increases the first weighting coefficient of the speed deviation (S14). On the other hand, in a case where the distance between the vehicle and the preceding vehicle is shorter than the threshold (NO at S13), the deciding section 123 reduces the first weighting coefficient of the speed deviation (S15).

In a case where the distances between the vehicle and a lane boundary that is acquired by the acquiring section 121 is equal to or greater than the threshold (YES at S16), the deciding section 123 increases the second weighting coefficient of the lateral deviation (S17). On the other hand, in a case where the distance between the vehicle and the lane boundary is shorter than the threshold (NO at S16), the deciding section 123 reduces the second weighting coefficient of the lateral deviation (S18).

In a case where the azimuth deviation acquired by the acquiring section 121 is equal to or greater than the threshold (YES at S19), the deciding section 123 increases the third weighting coefficient of the azimuth deviation (S20). On the other hand, in a case where the azimuth deviation is smaller than the threshold (NO at S19), the deciding section 123 reduces the third weighting coefficient of the azimuth deviation (S21).

In a case where manipulation to end the processes is not performed (NO at S22), the driving control device 10 repeats S11 to S21 in order to decide the first weighting coefficient of the speed deviation, the second weighting coefficient of the lateral deviation and the third weighting coefficient of the azimuth deviation on the basis of parameters representing the vehicle state and parameters representing the situation around the vehicle that are acquired by the acquiring section 121 at the time of the next period. In a case where manipulation to end the processes is performed (YES at S22), the driving control device 10 ends the processes.

[Modification Example]

Whereas the explanation above illustrates an operation performed by the calculating section 122 to calculate the acceleration/deceleration instruction value and the steering angle instruction value in the next period for minimizing the output value of the evaluation function, the calculating section 122 may calculate the acceleration/deceleration instruction value and the steering angle instruction value in the next period for maximizing the output value of the evaluation function. For example, in a case where the reciprocal of the output value J represented by Formula (3) is output as the output value of the evaluation function, the calculating section 122 calculates the acceleration/deceleration instruction value and the steering angle instruction value in the next period for maximizing the output value of the evaluation function.

[Effects of Driving Control Device 10]

As explained above, the driving control device 10 has: the acquiring section 121 that acquires the lateral deviation of the vehicle, the speed deviation of the vehicle and the azimuth deviation of the vehicle; and the calculating section 122 that calculates the acceleration/deceleration instruction value and the steering angle instruction value of the vehicle for the time of the next period such that the output value of the evaluation function to which the lateral deviation of the vehicle, the speed deviation of the vehicle and the azimuth deviation of the vehicle that are acquired by the acquiring section 121 are input is minimized. Then, the deciding section 123 decides the respective weighting coefficients of the lateral deviation, the speed deviation and the azimuth deviation on the basis of the situation around a position where the vehicle is travelling.

Since the driving control device 10 operates in this manner, the driving control device 10 can change the weighting as to whether to change the speed of the vehicle or change the steering angle of the vehicle depending on the situation around a position where the vehicle is travelling. As a result, the driving control device 10 can improve the safety of the vehicle depending on the situation around the position where the vehicle is travelling.

Although the present invention has been explained thus far by using an embodiment, the technical scope of the present invention is not limited by the scope of the description of the embodiment described above, but can be modified and changed variously within the scope of the gist. For example, all or some of devices can be configured in a functionally or physically distributed/integrated manner in any units. In addition, embodiments of the present invention include new embodiments that are generated by combining any ones of a plurality of embodiments also. Effects of the new embodiments generated by the combination combine effects of the original embodiments.

DESCRIPTION OF THE REFERENCE NUMERALS

1: State identifying device
2: Travel control device
10: Driving control device
11: Storage section
12: Control section
121: Acquiring section
122: Calculating section
123: Deciding section
124: Travel control section
The invention claimed is:

1. A driving control device comprising:
an acquiring section that acquires: a lateral deviation which is a difference between a position where a vehicle is travelling and a target travelling position of the vehicle in a direction orthogonal to an advancing direction of the vehicle; a speed deviation which is a difference between a speed of the vehicle and a target speed of the vehicle at the position where the vehicle is travelling; and an azimuth deviation which is a difference between an azimuth of the vehicle and a target azimuth of the vehicle at the position where the vehicle is travelling;
a deciding section that decides a first weighting coefficient of the speed deviation and a second weighting coefficient of the lateral deviation in an evaluation function including, as variables, the lateral deviation, the speed deviation, the azimuth deviation, an acceleration/deceleration instruction value and a steering angle instruction value, on a basis of a situation around the position where the vehicle is travelling, the situation influencing at least any one of a travelling speed and a travelling position of the vehicle;
a calculating section that calculates the acceleration/deceleration instruction value and the steering angle instruction value for a time of a next period for minimizing or maximizing an output value of the evaluation function, by periodically inputting the lateral deviation, the speed deviation and the azimuth deviation to the evaluation function; and
a travel control section that causes the vehicle to travel on a basis of the acceleration/deceleration instruction value and the steering angle instruction value calculated by the calculating section, wherein,
the deciding section increases the first weighting coefficient of the speed deviation in a case where a distance between the vehicle and a preceding vehicle travelling in front of the vehicle is shorter than a threshold, and
the calculating section calculates the acceleration/deceleration instruction value and the steering angle instruction value such that the rate of change of the speed deviation or the acceleration/deceleration instruction value becomes greater than the rates of change of the lateral deviation, the azimuth deviation, and the steering angle instruction value.

2. The driving control device according to claim 1, wherein
the acquiring section acquires an upper limit value of an absolute value of acceleration/deceleration of the vehicle, and the deciding section reduces the first weighting coefficient of the speed deviation in a case where an absolute value of the acceleration/deceleration instruction value calculated by the calculating section is greater than the upper limit value.

3. The driving control device according to claim 1, wherein the deciding section decides a third weighting coefficient of the azimuth deviation in the evaluation function on a basis of a situation around the position where the vehicle is travelling, the situation influencing an orientation of the vehicle.

4. The driving control device according to claim 3, wherein the deciding section increases at least any one of the second weighting coefficient of the lateral deviation and the third weighting coefficient of the azimuth deviation in a case where the azimuth deviation is equal to or greater than a threshold.

5. The driving control device according to claim 4, wherein the deciding section increases the second weighting coefficient in a case where the azimuth deviation is equal to or greater than a threshold and the lateral deviation is large, and increases the third weighting coefficient in a case where the azimuth deviation is equal to or greater than the threshold and the lateral deviation is small.

6. The driving control device according to claim 3, wherein
the acquiring section acquires a curvature of a road surface where the vehicle is travelling, and
the deciding section decides the third weighting coefficient of the azimuth deviation on a basis of a magnitude of the curvature acquired by the acquiring section.

7. The driving control device according to claim 6, wherein the deciding section increases the third weighting coefficient as the curvature acquired by the acquiring section increases.

8. The driving control device according to claim 3, wherein the deciding section increases at least any one of the second weighting coefficient of the lateral deviation and the third weighting coefficient of the azimuth deviation in a case where a distance between the vehicle and a lane boundary closest to the vehicle is shorter than a threshold.

9. The driving control device according to claim 3, wherein
the acquiring section acquires an upper limit value of an absolute value of a steering angle of the vehicle, and
the deciding section reduces at least any one of the second weighting coefficient of the lateral deviation and the third weighting coefficient of the azimuth deviation in a case where the steering angle instruction value calculated by the calculating section is greater than the upper limit value.

10. The driving control device according to claim 7, wherein
the calculating section calculates the steering angle instruction value and the acceleration/deceleration instruction value such that the rate of change of the lateral deviation, the azimuth deviation, or the steering angle instruction value becomes greater than the rates of change of the speed deviation and the acceleration/deceleration instruction value, if the deciding section increases the third weighting coefficient.

* * * * *